Patented June 1, 1926.

1,586,911

UNITED STATES PATENT OFFICE.

WILHELM MOSER, OF BASEL, SWITZERLAND, ASSIGNOR TO SOCIETY OF CHEMICAL INDUSTRY IN BASLE, OF BASEL, SWITZERLAND.

PROCESS FOR THE MANUFACTURE OF 2:3-DIAMINO-ANTHRAQUINONE.

No Drawing. Application filed April 13, 1923, Serial No. 631,914, and in Switzerland May 24, 1922.

I have found that 2:3-diamino-anthraquinone can be made in a very simple manner by heating 2-amino-3-bromo-anthraquinone with liquids containing ammonia in a closed vessel at 170–190° C. The reaction may also be conducted in presence of a catalyst, for instance of a copper compound.

The 2:3-diamino-anthraquinone thus obtained is very pure.

*Example.*

125 parts by weight of 2-amino-3-bromo-anthraquinone are heated with 1000 parts of aqueous ammonia solution of 28 per cent strength in an autoclave having a stirrer for 24 hours at 175–185° C. When the mixture has cooled the reaction product is filtered and the solid matter is washed with hot water and dried. There is thus obtained in excellent yield a very pure crystalline 2:3-diamino-anthraquinone.

Alcoholic ammonia may be substituted for aqueous ammonia. The reaction may be conducted in presence of a catalyst, for instance of a copper compound.

What I claim is:—

1. The herein described process for the manufacture of 2:3-diamino-anthraquinone, consisting in heating 2-amino-3-bromo-anthraquinone with liquids containing ammonia in a closed vessel.

2. The herein described process for the manufacture of 2:3-diamino-anthraquinone, consisting in heating 2-amino-3-bromo-anthraquinone with liquids containing ammonia in presence of a copper compound in a closed vessel.

3. As a new product the 2:3-diaminoanthraquinone obtained by heating in a closed vessel 2-amino-3-bromoanthraquinone with liquids containing ammonia, which product forms a dark brown powder, dyeing acetate silk weakly yellowish-brown tints.

In witness whereof I have hereunto signed my name this 26th day of March 1923.

WILHELM MOSER.